Figure 1:
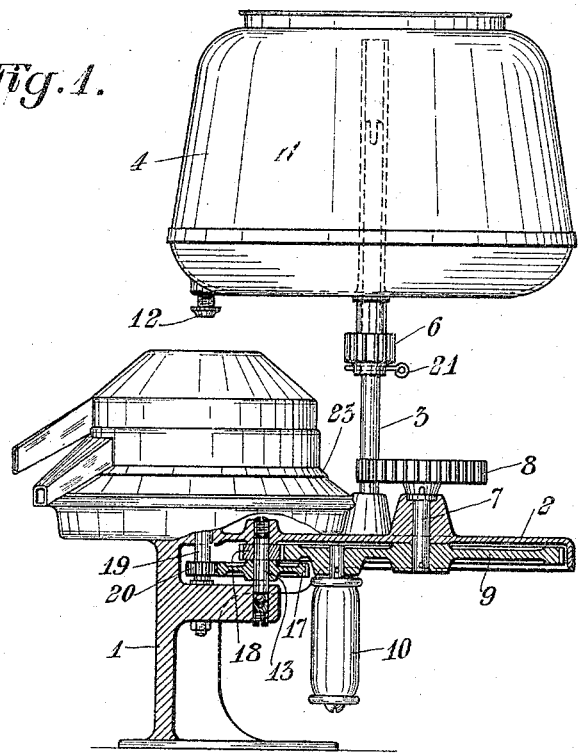

J. A. OHLSSON.
COMBINED CHURN AND MILK SEPARATOR.
APPLICATION FILED JAN. 13, 1915.

1,192,676.

Patented July 25, 1916.

Witnesses:
Fred. Nordijd
Konr. Dahlqvist

Inventor:
Johan Abraham Ohlsson

UNITED STATES PATENT OFFICE.

JOHAN ABRAHAM OHLSSON, OF STOCKHOLM, SWEDEN.

COMBINED CHURN AND MILK-SEPARATOR.

1,192,676.  Specification of Letters Patent.  Patented July 25, 1916.

Application filed January 13, 1915. Serial No. 1,965.

*To all whom it may concern:*

Be it known that I, JOHAN ABRAHAM OHLSSON, a subject of the King of Sweden, residing at Stockholm, in the Kingdom of Sweden, have invented a new and useful Improvement in Combined Churns and Milk-Separators, of which the following is a specification, reference being had to the drawing accompanying and forming a part thereof.

My invention relates to a combined churn and milk separator, in which the churn vessel is located and arranged in such manner that it can serve as a milk receptacle for the separator, the churn vessel remaining in its usual location or being raised on its supporter or spindle. By my invention the additional milk receiver or supply-tank hitherto used in combined churn and separators is thus made superfluous.

According to a suitable embodiment of my invention the churn vessel is arranged to be raised and lowered on its supporter. It may thus be placed in a low position when used as churn vessel and in a higher position when used as milk receptacle for the separator. The ordinary discharge opening in the bottom of the churn vessel for emptying the butter-milk is used as delivery opening for the milk when the vessel serves as milk receptacle, thus no other alteration in the vessel than the one described being necessary.

An embodiment of my invention is illustrated in the accompanying drawing, in which—

Figure 2:
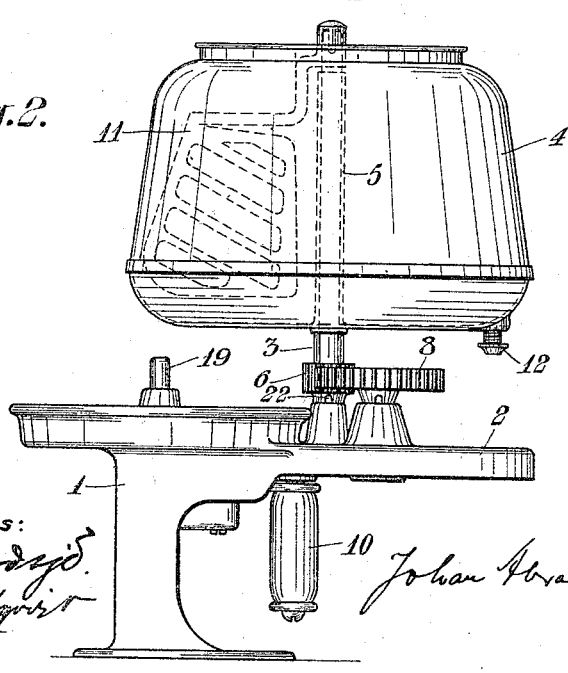

Figure 1 shows an elevation of the apparatus used as milk separator, the churn vessel serving as milk receptacle or supply-tank. Fig. 2 shows the apparatus used as a churn.

The frame 1 of the apparatus is provided with a shelf-like extension 2, which forms a cover for the driving gears of the apparatus. A supporter 3 is secured to the frame and on this supporter the churn vessel 4 is rotatably mounted (Fig. 2). From the bottom of the vessel 4 a tube 5 extends upward to the upper part of the same, said tube being soldered or in other manner tightly joined with the bottom of the vessel. To the lower side of the bottom of the vessel a sleeve is secured which surrounds the supporter 3 and is provided with a pinion 6. When the apparatus is used as a churn, as shown in Fig. 2, this pinion meshes with a gear 8 on a shaft 7 journaled in the extension 2 (Fig. 1). Below this extension or cover 2 there is secured to the shaft 7 a gear-wheel 9 provided with a handle 10. When the apparatus is used as a churn the usual churn-staff or wing 11 is fastened to the upper end of the supporter 3 as shown in Fig. 2. 12 denotes the usual discharge opening in the bottom of the vessel for emptying the butter-milk, which opening may be closed or opened as desired.

A shaft 13 is journaled in the frame 1 and to this shaft two gear-wheels 17 and 18 are secured. The gear 18 meshes with the gear 9. A spindle 19 is journaled in the frame in suitable manner, to which spindle a pinion 20 is secured which meshes with the gear 17. The upper end of the spindle projects above the frame 1 and is so arranged that a separator bowl may be fastened to the same.

When the apparatus is to be used as a churn the separator bowl and the parts belonging thereto are removed, as shown in Fig. 2. When turning the gear 9 by means of the handle 10 the vessel 4 will be made to rotate by means of the gears 8, 6 and the cream in the vessel will thus be treated by the wing 11.

When the apparatus is to be used as milk separator the churn vessel 4 is moved to an upper position as shown in Fig. 1, in which it is held for instance by means of a pin 21 or a cotter through the supporter 3. The sleeve for the pinion 6 is provided at its lower end with a slot 22 engaging the pin 21 and thus preventing the vessel 4 from turning on the supporter 3. The bowl of the separator is fastened to the spindle 19, whereupon a cover 23 as ordinarily used with milk separators is placed over the bowl resting on the part of the frame surrounding the spindle 19. On this cover the usual caps or pans with discharge spouts for the cream and the skimmed milk are placed. The pin 21 controls the position of the vessel 4 on the supporter 3 so that the delivery opening 12 of the same comes directly above the milk inlet opening of the separator.

The full milk is poured into the vessel 4. By operating the handle 10 the separator bowl is made to rotate by means of the gearing 9, 18, 17, 20 at the speed required for the separation of the milk. When the opening 12 is opened the full milk will flow down into the separator and the separation will take place in the usual manner. In order that the spindle 19 shall not be rotated when the apparatus is used as a churn, the gear 18 may for instance be arranged to be brought out of engagement with the gear 9, or some other arrangement may be used.

I claim:

1. In a combined churn and milk separator, the combination with a suitable base, of a separator bowl supported thereon, a support located adjacent to said bowl, a churn vessel rotatably mounted on said support, and means for securing said churn vessel to said support in such position that it can serve as a milk reservoir for said separator.

2. In a combined churn and milk separator, the combination with a suitable base, of a separator bowl rotatably mounted thereon, a support also located on said base, a churn vessel rotatably mounted on said support, means for rotating either said bowl or said vessel, and means for non-rotatably securing said vessel to said support in elevated position, whereby it can serve as a milk receptacle for said separator.

3. In a combined churn and milk separator, the combination of a separator bowl, a churn vessel arranged and located to serve as a milk receptacle for said separator, a common driving mechanism for said bowl and vessel, and means for connecting and disconnecting said driving mechanism from said churn vessel.

4. The combination with a suitable base, of a driving gear thereon, a spindle and a separator bowl thereon rotated by said gear, a vertical rod mounted on said base, a pinion and a churn vessel slidable on said rod and also rotated by said gear when in normal position, and means for holding said vessel in non-rotatable elevated position with said pinion disconnected from said gear.

5. The combination with a suitable base, of a driving gear thereon, a fixed vertical shaft on said base, a slidable sleeve surrounding said shaft, a pinion on said sleeve, driving connections intermediate said gear and said pinion for rotating the latter, a churn vessel on said sleeve, a vertical rotatable spindle on said base, a separator bowl mounted thereon, a pinion also on said spindle, connections intermediate said pinion and said gear, said vessel and said bowl being of such size as to interfere with each other if both were at the same vertical height whereby said vessel, when elevated on said shaft, overhangs said bowl and may act as a milk reservoir therefor, said first pinion being disconnected from said driving gear when in elevated position, and means for holding said parts in non-rotatable elevated position on said shaft.

JOHAN ABRAHAM OHLSSON.

Witnesses:
  FERD. NORDSJD,
  KONR. DAHLQUEST.

Copies of this patent may be obtained for five cents each, by addressing the "Commissioner of Patents, Washington, D. C."